United States Patent
Jennings et al.

(10) Patent No.: US 7,966,147 B2
(45) Date of Patent: Jun. 21, 2011

(54) GENERATING IMAGES ACCORDING TO POINTS OF INTERSECTION FOR INTEGER MULTIPLES OF A SAMPLE-TIME DISTANCE

(75) Inventors: William T. Jennings, Plano, TX (US); Dache' P. Barnhart, Wylie, TX (US)

(73) Assignee: Raytheon Company, Waltham, MA (US)

( * ) Notice: Subject to any disclaimer, the term of this patent is extended or adjusted under 35 U.S.C. 154(b) by 185 days.

(21) Appl. No.: 12/098,499

(22) Filed: Apr. 7, 2008

(65) Prior Publication Data

US 2009/0254302 A1 Oct. 8, 2009

(51) Int. Cl.
*G01C 22/00* (2006.01)

(52) U.S. Cl. ........ 702/159; 702/155; 702/189; 702/190; 367/7; 367/8; 342/179; 381/16; 381/17; 381/22; 381/23; 381/303; 381/306; 381/310

(58) Field of Classification Search .................... 367/7, 8
See application file for complete search history.

(56) References Cited

U.S. PATENT DOCUMENTS

| | | | | |
|---|---|---|---|---|
| 4,914,604 A | * | 4/1990 | Castelaz | 235/414 |
| 5,446,461 A | * | 8/1995 | Frazier | 342/22 |
| 5,706,817 A | | 1/1998 | Song et al. | 128/661.09 |
| 5,835,054 A | * | 11/1998 | Warhus et al. | 342/22 |
| 6,755,787 B2 | | 6/2004 | Hossack et al. | 600/447 |
| 7,148,836 B2 | * | 12/2006 | Romero et al. | 342/22 |
| 7,319,760 B2 | | 1/2008 | Sekine et al. | 381/17 |
| 2004/0138560 A1 | * | 7/2004 | Paladini | 600/437 |
| 2006/0238407 A1 | * | 10/2006 | Bourdelais et al. | 342/90 |
| 2008/0165046 A1 | * | 7/2008 | Fullerton et al. | 342/21 |

OTHER PUBLICATIONS

Sostanovsky et al., "UWB Radar Imaging System with Two-element Receiving Array Antenna," 5th International Conference on Antenna Theory & Technique, Kiev, Ukraine, May 2005, pp. 357-360.*
Withington et al., "Enhancing Homeland Security with Advanced UWB Sensors," IEEE Microwave Magazine (2003).*
Willis, "Advances in Bistatic Radar," (2007).*
U.S. Appl. No. 12/371,661, by inventors William T. Jennings et al., entitled "*Suppressing Interference In Imaging Systems*," 34 pages. filed Feb. 16, 2009.

* cited by examiner

*Primary Examiner* — Drew A Dunn
*Assistant Examiner* — Hyun Park
(74) *Attorney, Agent, or Firm* — Baker Botts L.L.P.

(57) ABSTRACT

According to one embodiment, generating images according to intersection points includes obtaining samples of signals from transmitter-receiver pairs. A transmitter-receiver pair is configured to transmit a signal and receive the signal reflected by an object. Intersection points are determined, where an intersection point indicates an intersection for integer multiples of a sample-time distance. A subset of samples corresponding to the intersection points is selected. Image data is generated from the selected subset of samples, where the image data is used to generate an image of the object.

21 Claims, 8 Drawing Sheets

GENERATING IMAGES ACCORDING TO POINTS OF INTERSECTION FOR INTEGER MULTIPLES OF A SAMPLE-TIME DISTANCE

TECHNICAL FIELD

This invention relates generally to the field of imaging systems and more specifically to generating images according to points of intersection for integer multiples of a sample-time distance.

BACKGROUND

Imaging systems generate images of objects. An imaging system typically receives signals reflected from an object and generates an image of that object from the reflected signals. Certain imaging devices may generate images of objects that are on the other side of a barrier. Some of these devices, however, cannot generate clear images of the object.

SUMMARY OF THE DISCLOSURE

In accordance with the present invention, disadvantages and problems associated with previous techniques for generating images may be reduced or eliminated.

According to one embodiment, generating images according to intersection points includes obtaining samples of signals from transmitter-receiver pairs. A transmitter-receiver pair is configured to transmit a signal and receive the signal reflected by an object. Intersection points are determined, where an intersection point indicates an intersection for integer multiples of a sample-time distance. A subset of samples corresponding to the intersection points is selected. Image data is generated from the selected subset of samples, where the image data is used to generate an image of the object.

Certain embodiments of the invention may provide one or more technical advantages. A technical advantage of one embodiment may be that an image is generated from samples that correspond to points of intersection for integer multiples of a sample-time distance. The points of intersection identify samples that traveled an integer multiple of a sample-time distance, where the sample-time distance is the distance that a signal travels during a sample period. Generating an image from these samples may allow for improvement of the quality of an image derived from the samples.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5B of the drawings, like numerals being used for like and corresponding parts of the various drawings.

Figure 1:
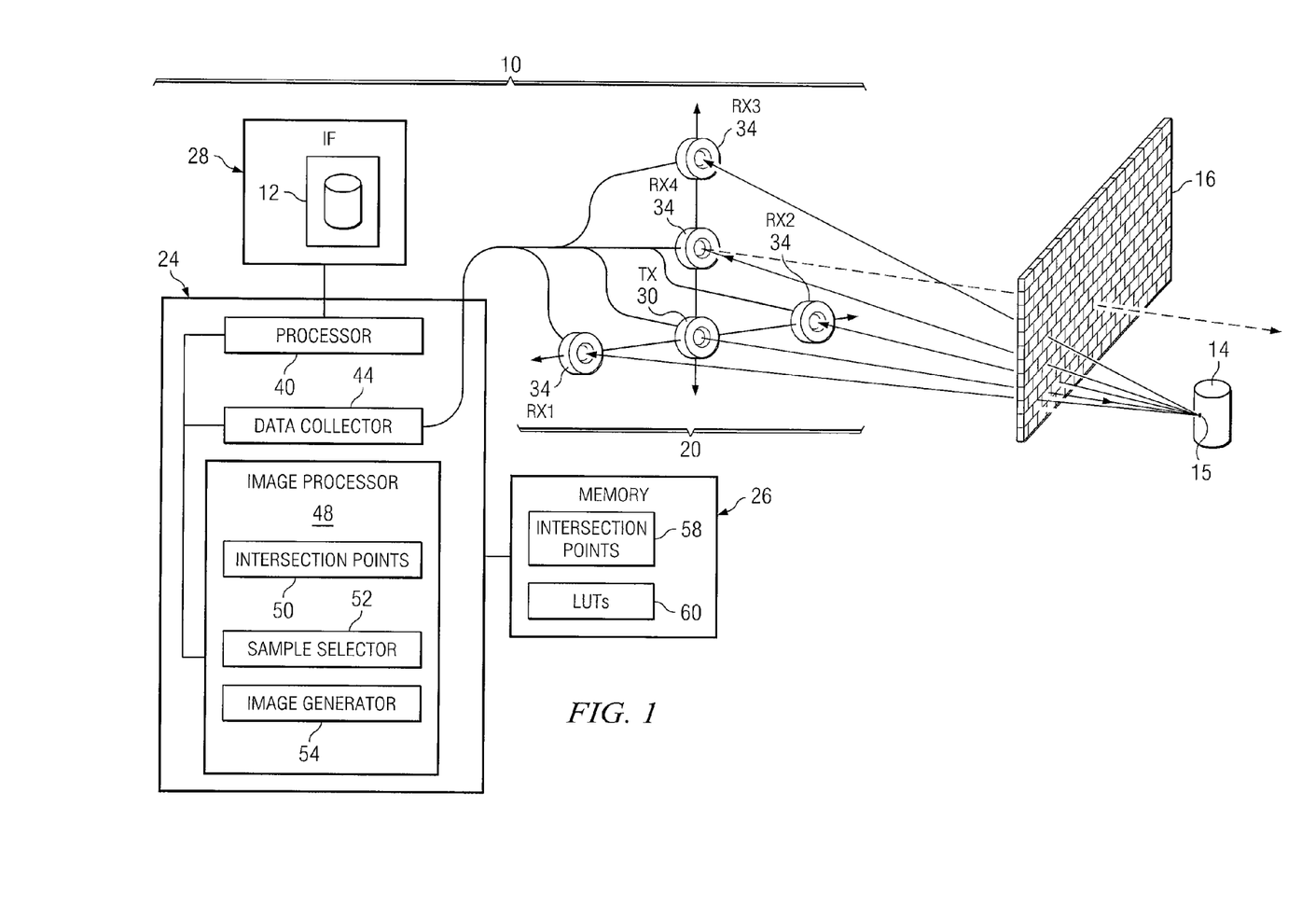
FIG. 1 illustrates an embodiment of an imaging system configured to generate images according to points of intersection for integer multiples of a sample-time distance.

FIG. 1 illustrates an embodiment of an imaging system 10 configured to generate images according to points of intersection for integer multiples of a sample-time distance. Imaging system 10 generates an image 12 of object 14, which may be behind an obstruction 16. In the embodiment, imaging system 10 generates image 12 from samples that correspond to points of intersection for integer multiples of a sample-time distance. The intersection points of intersection identify samples that traveled an integer multiple of a sample-time distance, where the sample-time distance is the distance that a signal travels during a sample period. The intersection points may be used to associate signal sample values with image space points.

Object 14 represents any suitable physical object that can reflect signals. In the illustrated embodiment, a signal is reflected from a point 15 of that object. In general, signals are reflected from multiple points 15 of object 14. Each reflected signal carries image information about the point 15 from which it was reflected. Image information derived from the multiple signals may be used to generate image 12 of object 14.

Image 12 represents a visual (such as optical) representation of object 14. Image 12 may comprise one or more images, for example, a still photograph or a sequence of images that form a movie or video. Image 12 may have two or three spatial dimensions. Image 12 includes image units that form image 12 in Cartesian space. A pixel is a two-dimensional image unit, and a voxel is a three-dimensional image unit.

Obstruction 16 represents a physical barrier that blocks one or more frequencies of electromagnetic radiation. For example, obstruction 16 blocks visible light, such that object 14 on one side of obstruction 16 is not visible to a viewer on the other side. Examples of obstruction 16 include a building part (such as a wall, door, or ceiling), the ground, or other physical element.

In the illustrated embodiment, imaging system 10 includes an antenna array 20, logic 24, a memory 26, and an interface 28 coupled as shown. In general, antenna array 20 receives signals reflected from object 14, logic 24 generates image data from samples of the signals and from information stored in memory 26, and interface 28 displays image 12 generated from the image data. In one embodiment, antenna array 20 may be attached to a vehicle capable of moving, and may itself move with respect to the vehicle.

Antenna array 20 includes antenna elements, where an antenna element transmits and/or receives a signal. When transmitting a signal, an antenna element is regarded as a transmitter 30, and when receiving a signal, an antenna element is regarded as a receiver 34. In the illustrated embodiment, antenna array 20 includes transmitter TX and receivers RX1, RX2, RX3, and RX4.

A transmitter-receiver pair includes a transmitter that transmits a signal and a receiver that receives the signal. The signal may be reflected by an object (such as object 14 or obstruction 16) after emission and prior to reception. In the illustrated embodiment, antenna array 20 includes transmitter-receiver pairs TX-RX1, TX-RX2, TX-RX3, and TX-RX4. The round-trip distance for a transmitter-receiver pair is the distance a signal travels as the signal is transmitted from transmitter 30, reflected from object 14, and received by receiver 34.

In certain embodiments, transmitter 30 transmits very sharp discrete pulses, as in impulsive radar. The duration of the pulse is typically very short relative to the round-trip distance. Receiver 34 may sample the received signal, and may sample the signal at a fixed sampling rate.

Antenna array 20 has any suitable number of antenna elements that form any suitable number of transmitter-receiver pairs as may be used for a particular application. For example, antenna array 20 may have one transmitter-receiver pair that includes one transmitter and one receiver; two transmitter-receiver pairs that include one transmitter and two receivers, two transmitters and one receivers, or two transmitters and two receivers; three transmitter-receiver pairs that include one transmitter and three receivers or three transmitters and one receiver; four transmitter-receiver pairs that include one transmitter and four receivers (as shown) or four transmitters and one receiver; or more transmitter-receiver pairs.

In the illustrated embodiment, logic 24 includes a processor 40, a data collector 44, and an image processor 48 coupled as shown. Memory 26 records points 58 of intersection for integer multiples of a sample-time distance and stores one or more lookup tables (LUTs) 60. Data collector 44 receives samples of signals from receivers 34. The samples include image information that may be used to generate image 12 of object 14. Data collector 44 may process (such as filter) samples to allow them to be processed by image processor 48.

In particular embodiments, image processor 48 selects samples. Each sample corresponds to a receiver 34 of antenna array 20. Cross combinations of the selected points correspond to points of intersection for integer multiples of a sample-time distance. Image processor 48 performs calculations to generate image data from the selected samples. The image data is used to generate image 12. The intersection points identify samples that traveled an integer multiple of a constant sample time signal propagation distance. In the illustrated embodiment, image processor 48 includes an intersection point module 50, a sample selector 52, and an image generator 54 coupled as shown.

Intersection point module 50 establishes round-trip ellipsoids for each transmitter-receiver pair of antenna array 20, and calculates the intersection points of the intersections of the round-trip ellipsoids. In one embodiment, intersection point module 50 calculates the intersection points of the intersections of integer round-trip ellipsoids.

In certain embodiments, a round-trip ellipsoid is a Fresnel ellipse or ellipsoid formed from points having the same round-trip distances for a transmitter-receiver pair. In certain embodiments, a roundtrip ellipsoid is an integer multiple of a sample-time distance roundtrip ellipsoid. In the embodiments, sample-time distance is the distance that a signal travels during a sample period. A roundtrip ellipsoid is formed from points with the same integer roundtrip distance. Examples of calculating the points of intersection for integer multiples of a sample-time distance are described in more detail with reference to FIGS. 2A through 2C.

Sample selector 52 selects samples corresponding to the points of intersection for integer multiples of a sample-time distance. Sample selector 52 may select samples by using a causal filtering function to filter samples from receivers 34. Examples of filtering functions include cross multiplication, cross summation, cross correlation, matched filter, and/or other filter function.

Image generator 54 obtains values from the selected samples and maps the values to image units to generate image 12. In particular embodiments, the values may represent brightness and/or color. A value may be mapped to an image unit to designate the appearance of image 12 at the image unit.

Image generator 54 may map the values to image units in any suitable manner. In particular embodiments, image generator 54 may determine an image unit that corresponds to an intersection point, and then may map the value from samples associated with the intersection point to the image unit corresponding to the intersection point.

The image unit that corresponds to a given intersection point may be determined in any suitable manner. In particular embodiments, image generator 54 accesses one or more lookup tables 60. In certain embodiments, a look-up table 60 may be constructed for sets of three transmitter-receiver pairs. A look-up table 60 may be calculated relative to the reference frame of array 20.

In one embodiment, a lookup table 60 may map intersection points to corresponding image units. In another embodiment, a first lookup table 60 may map the intersection to points in Cartesian space, and a second lookup table 60 may map Cartesian points to corresponding image units. In the embodiment, the Cartesian space may be a Cartesian coordinate system that is defined with respect to antenna array 20.

In particular embodiments, intersection points are not uniformly distributed in Cartesian space. Accordingly, zero, one, two, or more intersection points may correspond to a particular image unit. Examples of generating information for lookup tables 60 is described in more detail with reference to FIGS. 4A and 4B.

Image generator 54 may perform other suitable image generating operations. As an example, image generator 54 may apply a weighting function to account for smaller energy contributions of signals from points 15 farther away from transmitter 30. As another example, image generator 54 may determine a specific area to be imaged, and then search a look-up 60 table associated with that specific area.

Interface 28 displays image 12 generated from the image data. Interface 28 may comprise a two- or three-dimensional display such as a screen for a computer, a helmet, and/or a television.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

System 10 may be embodied as any suitable imaging system. Examples of such imaging systems include a ground penetrating radar (GPR), a through-the-wall (TTW), an impulsive radar, and an ultra-wide band (UWB) radar system. Imaging system 10 may be used for any suitable application, for example, buried land mine detection, imaging, subsurface inspection, and/or other suitable application.

Modifications, additions, or omissions may be made to system 10 without departing from the scope of the invention. The components of system 10 may be integrated or separated. Moreover, the operations of system 10 may be performed by more, fewer, or other components. For example, the operations of sample selector 52 and image generator 54 may be performed by one component, or the operations of image generator 54 may be performed by more than one component. Additionally, operations of system 10 may be performed using any suitable logic comprising software, hardware, and/or other logic. As used in this document, "each" refers to each member of a set or each member of a subset of a set.

Figure 2A:
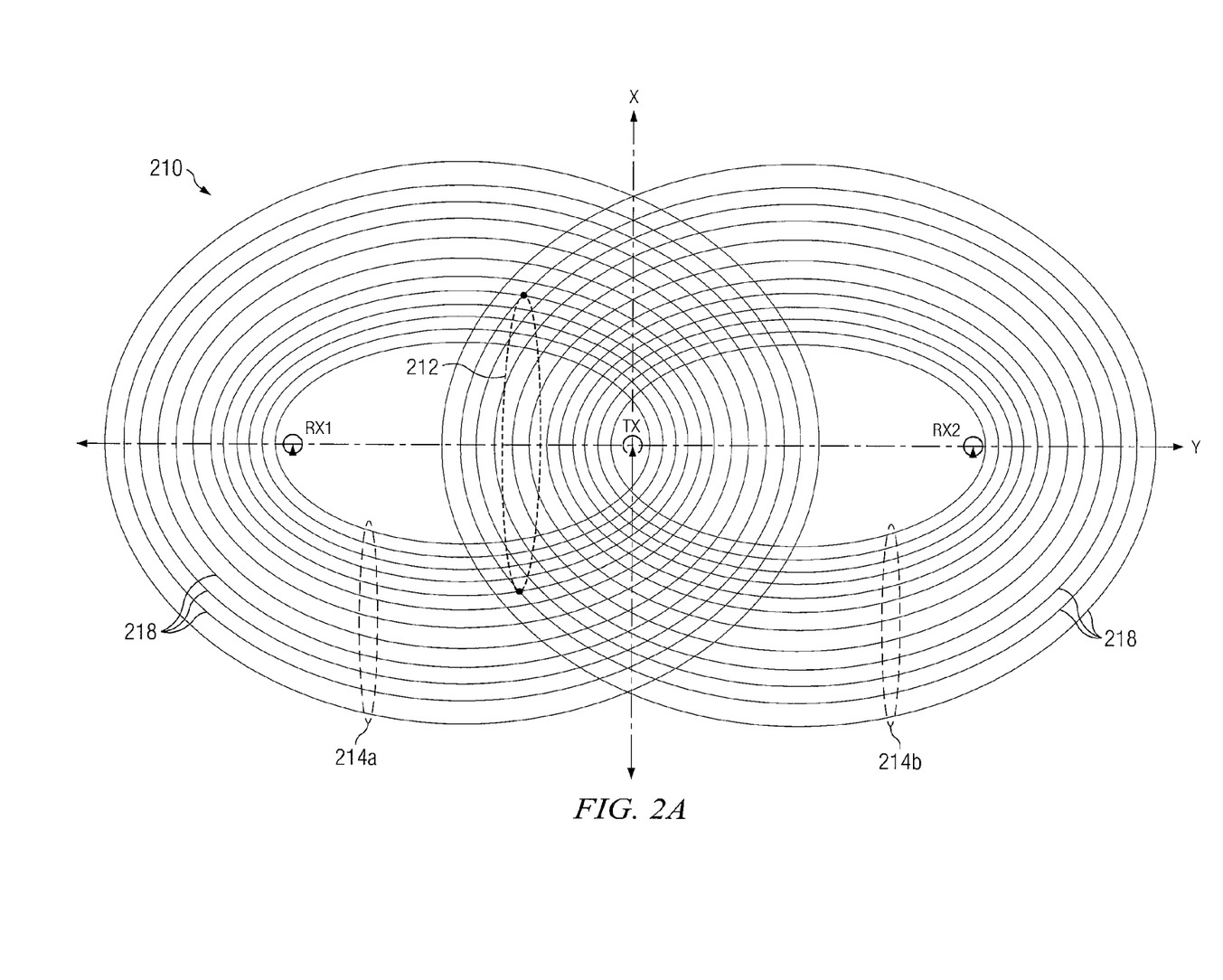
FIGS. 2A through 2C illustrate one embodiment of a method for calculating intersection points for an example arrangement of a transmitter and receivers.
Figure 2B:
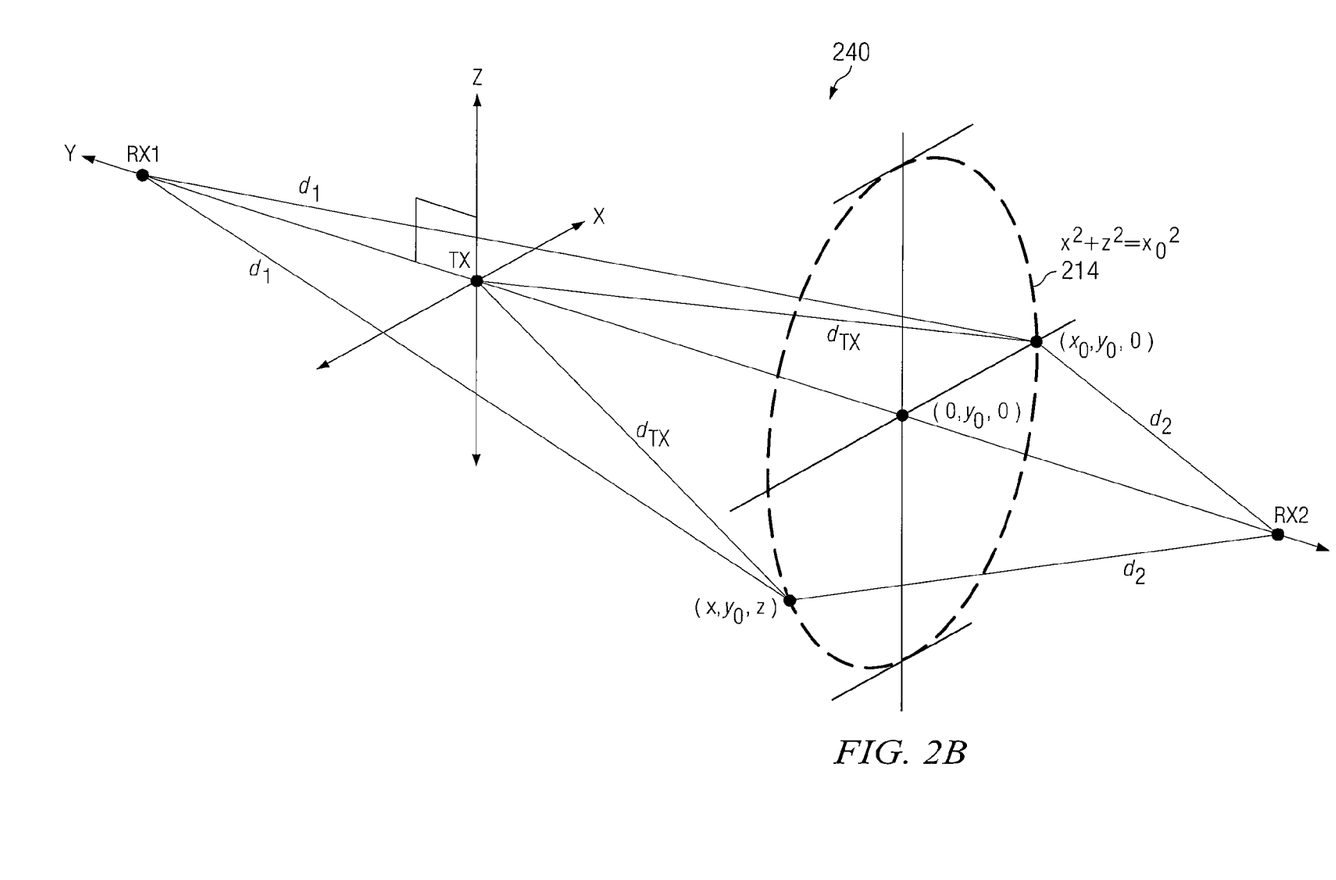
Figure 2C:
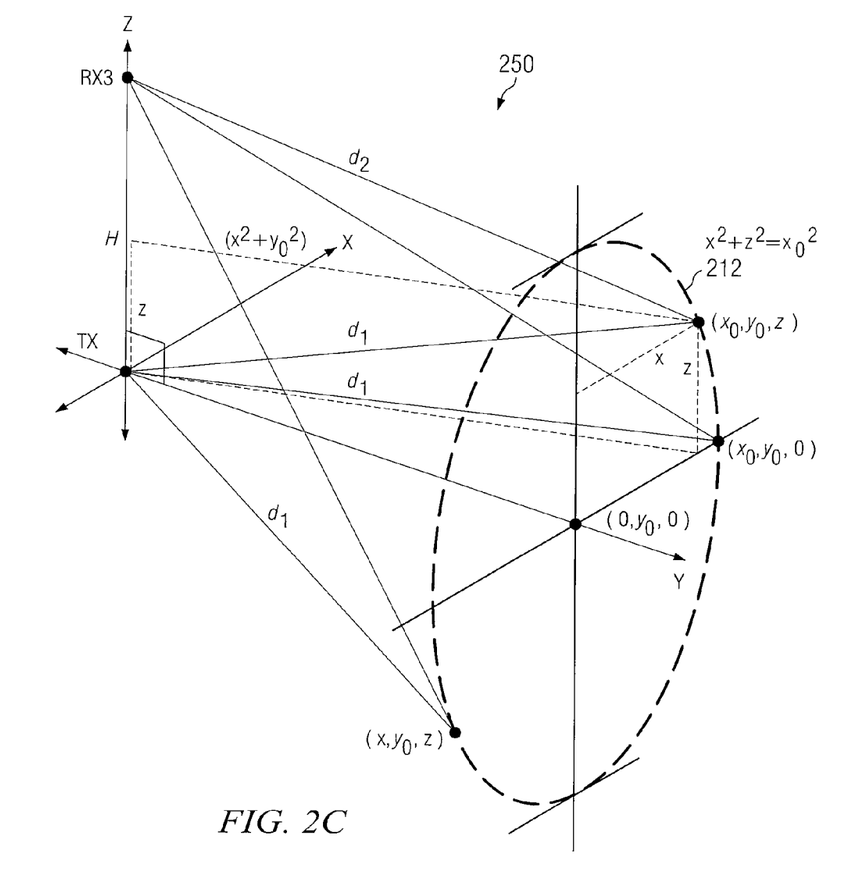

FIGS. 2A through 2C illustrate one embodiment of a method for calculating intersection points for an example arrangement of transmitter 30 and receivers 34. In the example, transmitter 30 and receivers 34 include transmitter TX and receivers RX1, RX2, and RX3 that form transmitter-receiver pairs TX-RX1, TX-RX2, and TX-RX3. Transmitter TX and receivers RX1 and RX2 are co-linear.

Sample-time distance $D_s$ represents the distance a signal travels during a sample period. In the example, receivers 34 sample signals at a fixed rate $F_s$. The sample-time distance $D_s = c/F_s$, where c is the speed of light. Integer round-trip distance $L \cdot D_s$, where L is an integer, represents a round-trip distance that is an integer multiple of sample-time distance $D_s$.

FIG. 2A is a two-dimensional graph 210 of examples of sets 214 (214a,b) of round-trip ellipsoids 218. Points with the same integer multiple of the round-trip distance form a round-trip ellipsoid 218. Each transmitter-receiver pair has a set 214 of such round-trip ellipsoids 218. Set 214a is for transmitter-receiver pair TX-RX1, and set 214b is for transmitter-receiver pair TX-RX2. A round-trip ellipsoid 218 of one set 214a may intersect another round-trip ellipsoid 218 of another set 214b at an intersection ellipse, such as an intersection circle 212.

In the illustrated example, receiver RX1, transmitter TX, and receiver RX2 are co-linear. Since they are co-linear, the intersection ellipse is an intersection circle. If they are not co-linear, the intersection ellipse is not a circle.

FIG. 2B is a three-dimensional graph 240 of intersection circle 212. Intersection circle 212 is the intersection of ellipsoids formed from integer multiples of the round-trip distances from transmitter-receiver pairs TX-RX1 and TX-RX2. In the example, intersection circle 212 is:

$$x^2 + z^2 = x_0^2$$

In the example, receiver RX3 is at point (0, 0, H). The center of intersection circle 212 is at (0, $y_0$, 0), and the radius is $x_0$, the plane of the circle is perpendicular to the Y axis.

FIG. 2C is a graph 250 illustrating third receiver RX3. The intersection points where integer round-trip ellipses (not shown) of transmitter-receiver pair TX-RX3 intersect intersection circle 212 may be calculated as follows.

Distance $d_1$ represents the distance between transmitter TX and intersection circle 212. In the example, distance $d_1$ is:

$$d_1 = \mathrm{sqrt}(x_0^2 + y_0^2)$$

Distance $d_2$ represents the distance between RX3 and the intersection circle. Accordingly:

$$d_1 + d_2 = L \cdot D_s$$

For an arbitrary point $(x, y_0, z)$ on the intersection circle:

$$d_1 = \sqrt{(z^2 + x^2 + y_0^2)}$$

$$d_2 = \mathrm{norm}((0,0,H),(x,y_0,z))$$

$$= \sqrt{((H-z)^2 + x^2 + y_0^2)}$$

$$L \cdot D_s = d_1 + \sqrt{(H^2 - 2Hz + z^2 + y^2 + y_0^2)}$$

$$L \cdot D_s = d_1 + \sqrt{(H^2 - 2Hz + d_1^2)}$$

$$L \cdot D_s = d_1 + \sqrt{(H^2 - 2Hz + d_1^2)}$$

$$(L \cdot D_s - d_1)^2 = H^2 - 2Hz + d_1^2$$

$$2Hz = H^2 + d_1^2 - (LD_s - d_1)^2$$

$$2Hz = H^2 + d_1^2 - L^2 D_s^2 + 2LD_s d_1 - d_1^2$$

Consequently:

$$z = \{H^2 + 2LD_s d_1 - L^2 D_s^2\}/2H$$

where $d_1 = \sqrt{(x_0^2 + y_0^2)}$

The radius of intersection circle 212 is $x_0$, so:

$$x^2 + z^2 = x_0^2$$

Finally:

$$x = \sqrt{(x_0^2 - z^2)}$$

Given values for $x_0$, $y_0$, and H, the solution is:

$$x = \sqrt{(x_0^2 - z^2)}$$

$$y = y_0$$

$$z = \{H^2 + 2LD_s d_1 - L^2 D_s^2\}/2H$$

where $d_1 = \sqrt{(x_0^2 + y_0^2)}$.

Any suitable arrangement of three transmitter-receiver pairs yield a uniquely determined set of points of intersection for integer multiples of a sample-time distance. The set may include one transmitter and three receivers or three transmitters and one receiver.

In certain cases, there is not necessarily a unique set of intersection points. For example, if a fourth receiver is added, there is not necessarily a unique set of points. In these cases, the antenna elements may be decomposed into subsets of three transmitter-receiver pairs, or sub-arrays. A 3-space image may be constructed using any of these subsets. An image constructed from a particular subset may be referred to as a view. A composite image may be formed by combining multiple views.

Modifications, additions, or omissions may be made to the method without departing from the scope of the invention. The method may include more, fewer, or other steps. Additionally, steps may be performed in any suitable order.

Figure 3A:
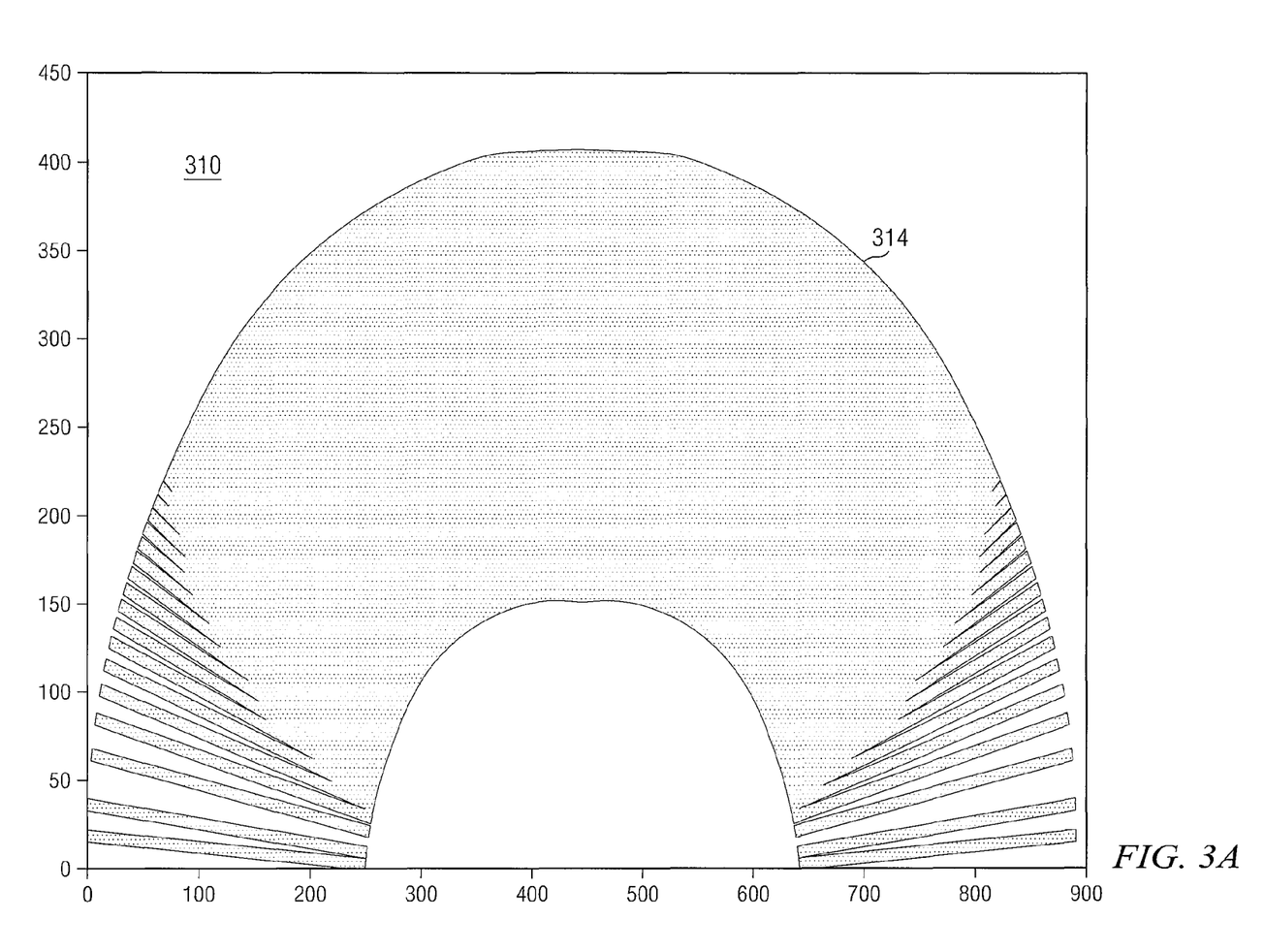
FIGS. 3A and 3B illustrate examples of intersection points translated into a Cartesian space.
Figure 3B:
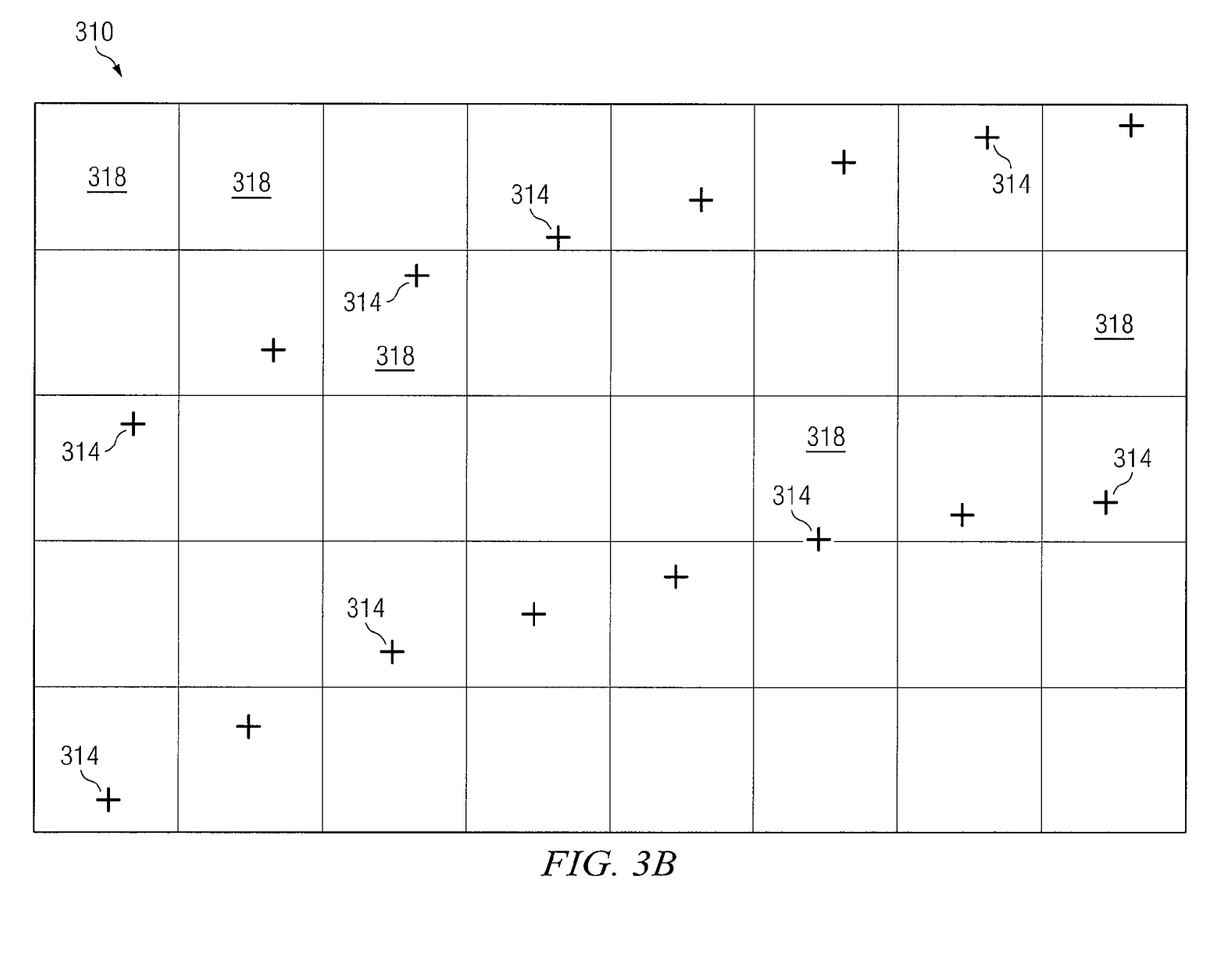

FIGS. 3A and 3B illustrate intersection points translated into Cartesian space. The points may be translated into any suitable Cartesian space such as a Cartesian coordinate system in the frame of reference of array 20. The intersection points in Cartesian space indicate valid combinations of indices representing receivers 34.

FIG. 3A is a graph 310 of points 314 of intersection for integer multiples of a sample-time distance plotted on an xy plane. In the example, intersection points 314 are shown to be non-uniformly distributed. The arrangement (including density) of points 314 is a function of the placement of transmitters 30 and receivers 34, as well as the sampling frequency.

FIG. 3B illustrates graph 310 at a smaller scale. Graph 310 includes cells 318 of the xy plane. In the example, certain cells 318 have a point 314 relatively close to the center of cell 318, other cells 318 have a point 314 at the edge of the cell 318, and yet other cells 318 have no points 314.

Figure 4A:
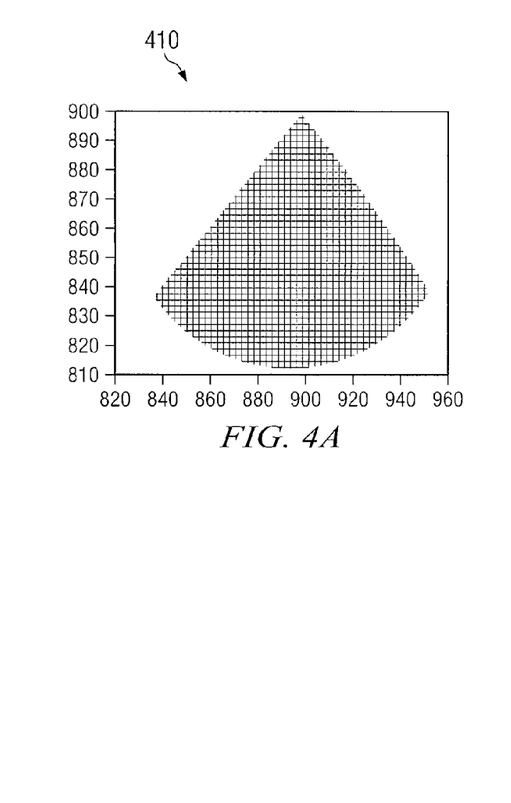
FIGS. 4A and 4B illustrate an example of valid combinations corresponding to the example arrangement of the transmitter and receivers of FIGS. 2A through 2C.
Figure 4B:
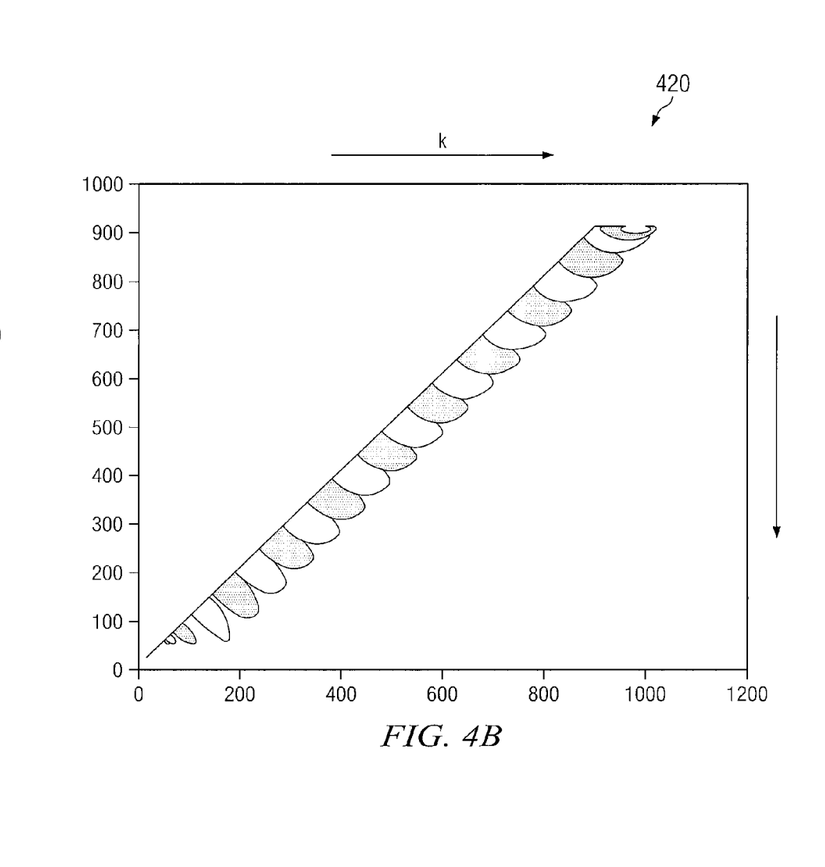

FIGS. 4A and 4B illustrate valid combinations for example receivers 34. In the example, index k represents integer values for receiver RX1, index 1 represents integer values for receiver RX2, and index m represents integer values for receiver RX3.

FIG. 4A is a graph 410 illustrating valid combinations for indices k, 1, and m=900. FIG. 4B is a graph 420 illustrating valid combinations for indices k and 1 and various values of m. Graphs 410 and 420 indicate that the valid combinations are limited. Accordingly, array points corresponding to the combinations may be bounded. Bounding the array points limits the number of points of intersection for integer multiples of a sample-time distance, which in turn limits the values calculated corresponding to the intersection points. Array points may be bounded by filtering signals from array 20.

Figure 5A:
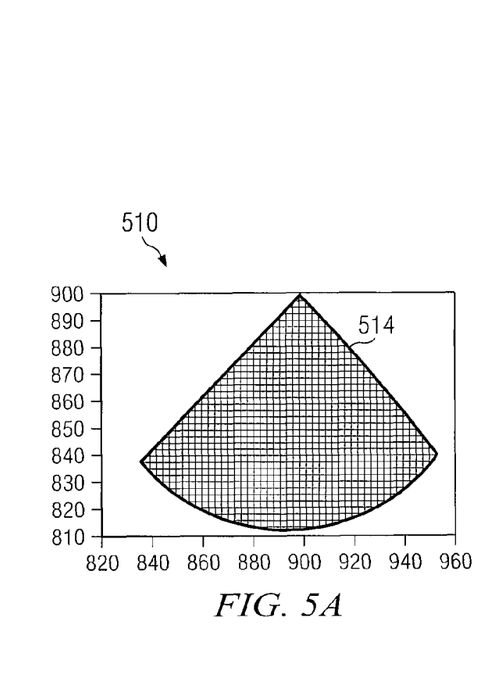
FIGS. 5A and 5B illustrate examples of boundaries that may be established for valid array points.
Figure 5B:
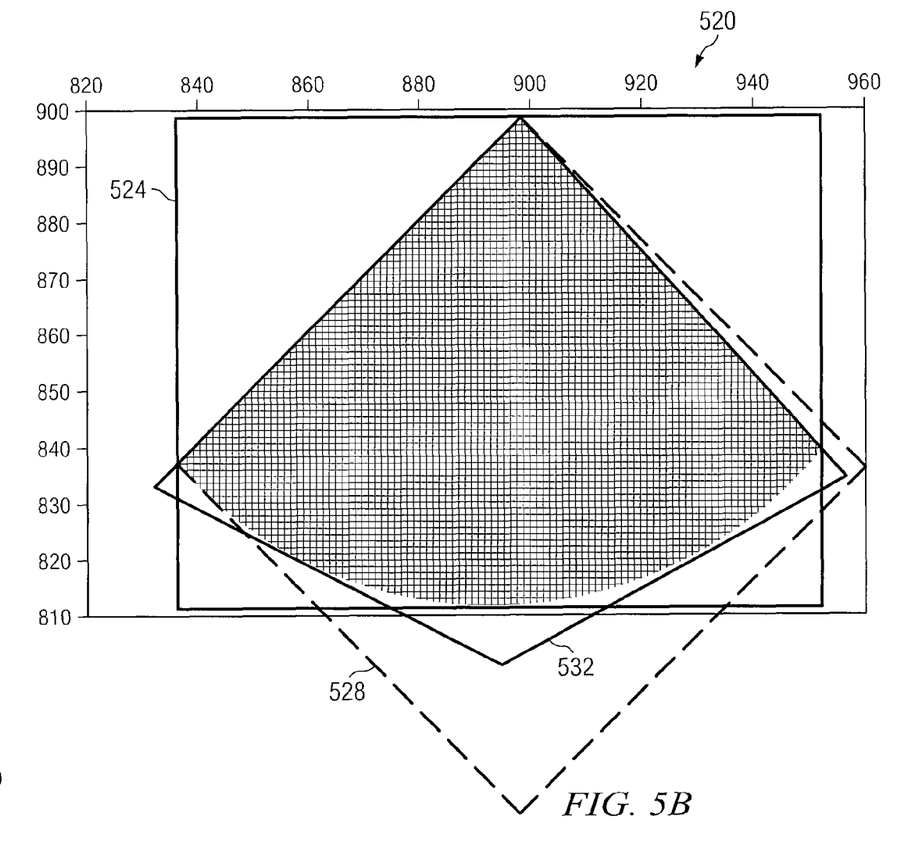

FIGS. 5A and 5B illustrate examples of such boundaries for array points. Any suitable boundary may be used. In general, a boundary that most accurately captures the points may be more complicated to calculate.

FIG. 5A is a graph 510 illustrating a tight boundary 514. Tight boundary 514 may require a complex set of boundary checks. FIG. 5B is a graph 520 illustrating a k×1 filtering boundary 524, a diagonal filtering boundary 528, and a polygonal boundary 532. K×1 filtering boundary 524 may be calculated from a cross multiplication of two specifically sized vectors. Diagonal filtering boundary 528 may be implemented by diagonal filtering. Polygonal boundary 532 may be implemented by incrementing boundary pointers as well as boundary checks.

Certain embodiments of the invention may provide one or more technical advantages. A technical advantage of one embodiment may be that an image is generated from samples that correspond to points of intersection for integer multiples of a sample-time distance. The intersection points are samples that traveled an integer multiple of a sample-time distance, where the sample-time distance is the distance that a signal travels during a sample period. Generating an image from these samples may improve the quality of the image.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
obtaining a plurality of samples of a plurality of signals from a plurality of transmitter-receiver pairs, a transmitter-receiver pair configured to transmit a signal and receive the signal reflected by an object;
identifying a plurality of integer multiples of a sample-time distance;
determining with a processor, using a logic encoded in one or more non-transitory computer-executable storage media, a plurality of intersection points, an intersection point indicating an intersection for the identified plurality of integer multiples of the sample-time distance;
selecting a subset of samples corresponding only to the intersection points; and
generating image data from the selected subset of samples, the image data used to generate an image of the object.

2. The method of claim 1, further comprising calculating the intersection points by:
for each transmitter-receiver pair, establishing a plurality of round-trip ellipsoids; and
calculating the intersection points from a plurality of intersections of the plurality of round-trip ellipsoids.

3. The method of claim 1, the plurality of transmitter-receiver pairs comprising three transmitter-receiver pairs.

4. The method of claim 1:
the plurality of transmitter-receiver pairs comprising a plurality of sets of three transmitter-receiver pairs; and
the determining the plurality of intersection points further comprising:
determining a set of intersection points for each set of three transmitter-receiver pairs.

5. The method of claim 1, the generating the image data from the selected subset of samples further comprising:
obtaining a plurality of values from the selected samples; and
mapping the values to a plurality of image units of the image.

6. The method of claim 1, the generating the image data from the selected subset of samples further comprising:
accessing one or more lookup tables that map an intersection point to a corresponding image unit.

7. The method of claim 1, the generating the image data from the selected subset of samples further comprising:
accessing a lookup table that maps an intersection point to a corresponding Cartesian coordinate point.

8. The method of claim 1, further comprising:
filtering the signals according to the intersection points.

9. The method of claim 1, further comprising:
determining an area to be imaged; and
selecting the intersection points according to the area to be imaged.

10. The method of claim 1, further comprising:
selecting a plurality of array points according to the intersection points.

11. A system comprising logic encoded in one or more non-transitory computer-executable storage media and when executed operable to:
obtain a plurality of samples of a plurality of signals from a plurality of transmitter-receiver pairs, a transmitter-receiver pair configured to transmit a signal and receive the signal reflected by an object; and
identify a plurality of integer multiples of a sample-time distance determine a plurality of intersection points, an intersection point indicating an intersection for the identified plurality of integer multiples of the sample-time distance;
select a subset of samples corresponding only to the intersection points; and
generate image data from the selected subset of samples, the image data used to generate an image of the object.

12. The system of claim 11, the logic further operable to calculate the intersection points by:
for each transmitter-receiver pair, establishing a plurality of round-trip ellipsoids; and
calculating the intersection points from a plurality of intersections of the plurality of round-trip ellipsoids.

13. The system of claim 11, the plurality of transmitter-receiver pairs comprising three transmitter-receiver pairs.

14. The system of claim 11:
the plurality of transmitter-receiver pairs comprising a plurality of sets of three transmitter-receiver pairs; and
the logic further operable to determine the plurality of intersection points by:
determining a set of intersection points for each set of three transmitter-receiver pairs.

15. The system of claim 11, the logic further operable to generate the image data from the selected subset of samples by:
obtaining a plurality of values from the selected samples; and
mapping the values to a plurality of image units of the image.

16. The system of claim 11, the logic further operable to generate the image data from the selected subset of samples by:
accessing one or more lookup tables that map an intersection point to a corresponding image unit.

17. The system of claim 11, the logic further operable to generate the image data from the selected subset of samples by:
accessing a lookup table that maps an intersection point to a corresponding Cartesian coordinate point.

18. The system of claim 11, the logic further operable to:
filter the signals according to the intersection points.

19. The system of claim 11, the logic further operable to:
determine an area to be imaged; and
select the intersection points according to the area to be imaged.

20. The system of claim 11, the logic further operable to:
select a plurality of array points according to the intersection points.

21. A system comprising logic encoded in one or more non-transitory computer-executable storage media and when executed operable to:
obtain a plurality of samples of a plurality of signals from a plurality of transmitter-receiver pairs, a transmitter-receiver pair configured to transmit a signal and receive the signal reflected by an object, the plurality of transmitter-receiver pairs comprising a plurality of sets of three transmitter-receiver pairs;
calculate a plurality of intersection points by:
for each transmitter-receiver pair, establishing a plurality of round-trip ellipsoids; and calculating the intersection points from a plurality of intersections of the plurality of round-trip ellipsoids;
identify a plurality of integer multiples of a sample-time distance;
determine the intersection points, an intersection point indicating an intersection for the identified plurality of integer multiples of the sample-time distance, by:
determining a set of intersection points for each set of three transmitter-receiver pairs;
select a subset of samples corresponding only to the intersection points; and
generate image data from the selected subset of samples, the image data used to generate an image of the object, by:
obtaining a plurality of values from the selected samples;
accessing one or more lookup tables that map an intersection point to a corresponding image unit; and mapping the values to a plurality of image units of the image.

* * * * *